United States Patent
Primeau et al.

(10) Patent No.: US 6,365,253 B1
(45) Date of Patent: Apr. 2, 2002

(54) PLASTIC COIL AND METHOD OF FORMING SAME

(75) Inventors: André Primeau, Lac Beauport; Régent Corriveau, St-Jean Chrysostome; Jean T. Bédard, Charlesbourg; Jean-Claude Brisson, Ste-Foy, all of (CA)

(73) Assignee: 2751-3654 Quebec Inc., Quebec (CA)

( * ) Notice: Subject to any disclaimer, the term of this patent is extended or adjusted under 35 U.S.C. 154(b) by 0 days.

(21) Appl. No.: 09/712,219

(22) Filed: Nov. 15, 2000

Related U.S. Application Data

(62) Division of application No. 09/186,653, filed on Nov. 6, 1998, now Pat. No. 6,190,156.
(60) Provisional application No. 60/068,507, filed on Dec. 22, 1997.

(51) Int. Cl.[7] .......................... B29C 11/16; B65H 75/28
(52) U.S. Cl. ...................... 428/36.9; 264/281; 425/321
(58) Field of Search .......................... 428/371; 425/381, 425/381.2; 264/285, 281

(56) References Cited

U.S. PATENT DOCUMENTS

| | | | |
|---|---|---|---|
| 2,643,698 A | 6/1953 | Crooker | 153/64 |
| 3,147,578 A | 9/1964 | Calizzano | 57/34 |
| 3,711,035 A | 1/1973 | Tatum et al. | 242/7.01 |
| 3,729,800 A | * 5/1973 | Popovitsch | 29/207.5 R |
| 3,736,784 A | 6/1973 | Felker | 72/145 |
| 3,779,846 A | 12/1973 | Kelykamp et al. | 156/144 |
| 3,841,920 A | 10/1974 | Martin | 148/6.35 |
| 3,929,957 A | 12/1975 | Holden et al. | 264/150 |
| 4,033,808 A | 7/1977 | Petzetakis | 156/425 |
| 4,204,818 A | * 5/1980 | Reum | 425/66 |
| 4,249,278 A | 2/1981 | Pfaffle | 11/1 |
| 4,285,899 A | * 8/1981 | Pavy et al. | 264/180 |
| 4,325,184 A | 4/1982 | Omori | 29/766 |
| 4,485,059 A | 11/1984 | Krutchen et al. | 264/51 |
| 4,540,360 A | 9/1985 | Leo | 425/384 |
| 4,599,881 A | 7/1986 | Bachmann et al. | 72/128 |
| 5,061,338 A | 10/1991 | Huvey | 156/425 |
| 5,246,775 A | * 9/1993 | Loscuito | 428/343 |

FOREIGN PATENT DOCUMENTS

FR   1537466   * 9/1967

OTHER PUBLICATIONS

Operating instructions Automatic–Winder FD–1600, H. R. Leo Date : Aug. 22, 1994.

* cited by examiner

*Primary Examiner*—Harold Pyon
*Assistant Examiner*—Shalie Manlove
(74) *Attorney, Agent, or Firm*—Francois Martineau

(57) ABSTRACT

A continuous thermoplastic wire is heated and fed into a coil forming apparatus having a rotative drum holding an injection nozzle so that it registers with and be linked in a common rotative movement to a threaded mandrel also supported by the drum. The wire discharged by the nozzle slidably engages the threads of the mandrel into a helical pattern, the mandrel being radially and coaxially surrounded by a cooled sleeve. The wire will thus solidify along the helical thread of the mandrel, to form a continuous plastic coil being discharged at the downstream extremity of the mandrel and sleeve assembly. Due to the fact that the drum, mandrel and nozzle all rotate in a common rotative movement, it is possible to select the direction and speed of rotation of the three last-mentioned elements so that the coil being discharged have an ouput discharge translational speed, while being exempt of any absolute rotational movement about its longitudinal axis.

3 Claims, 2 Drawing Sheets

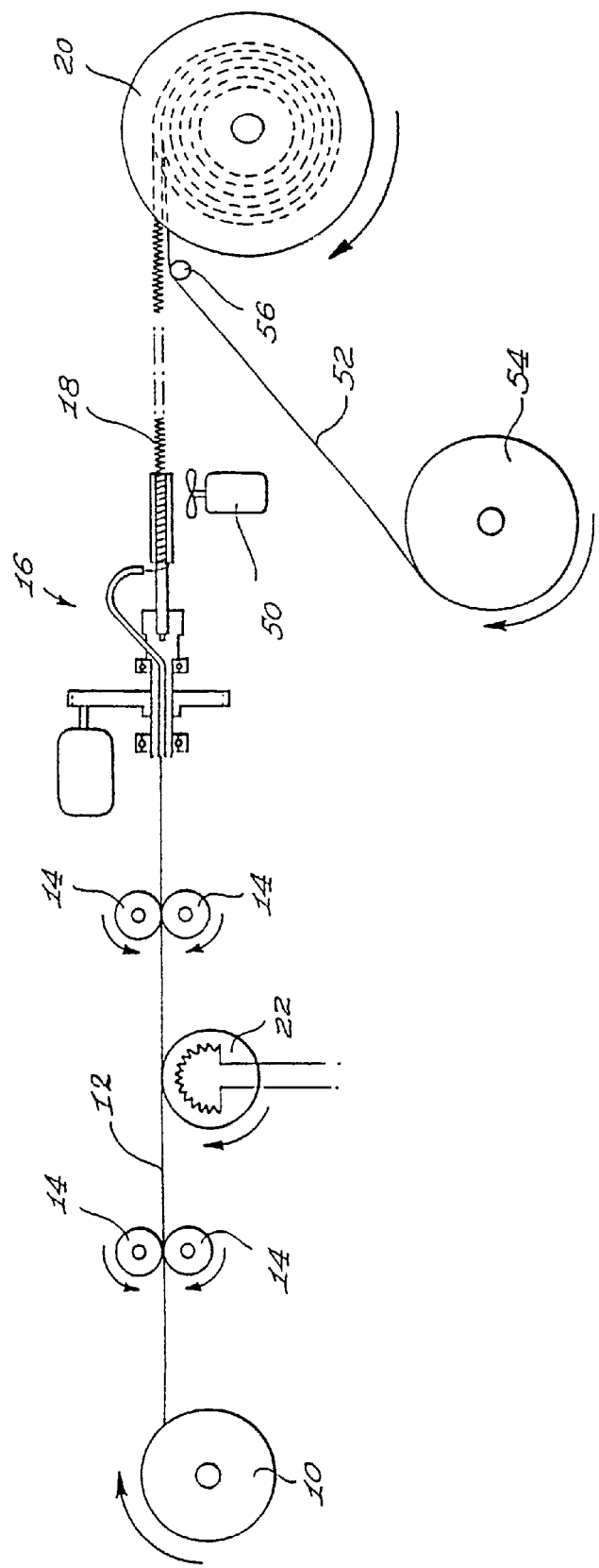

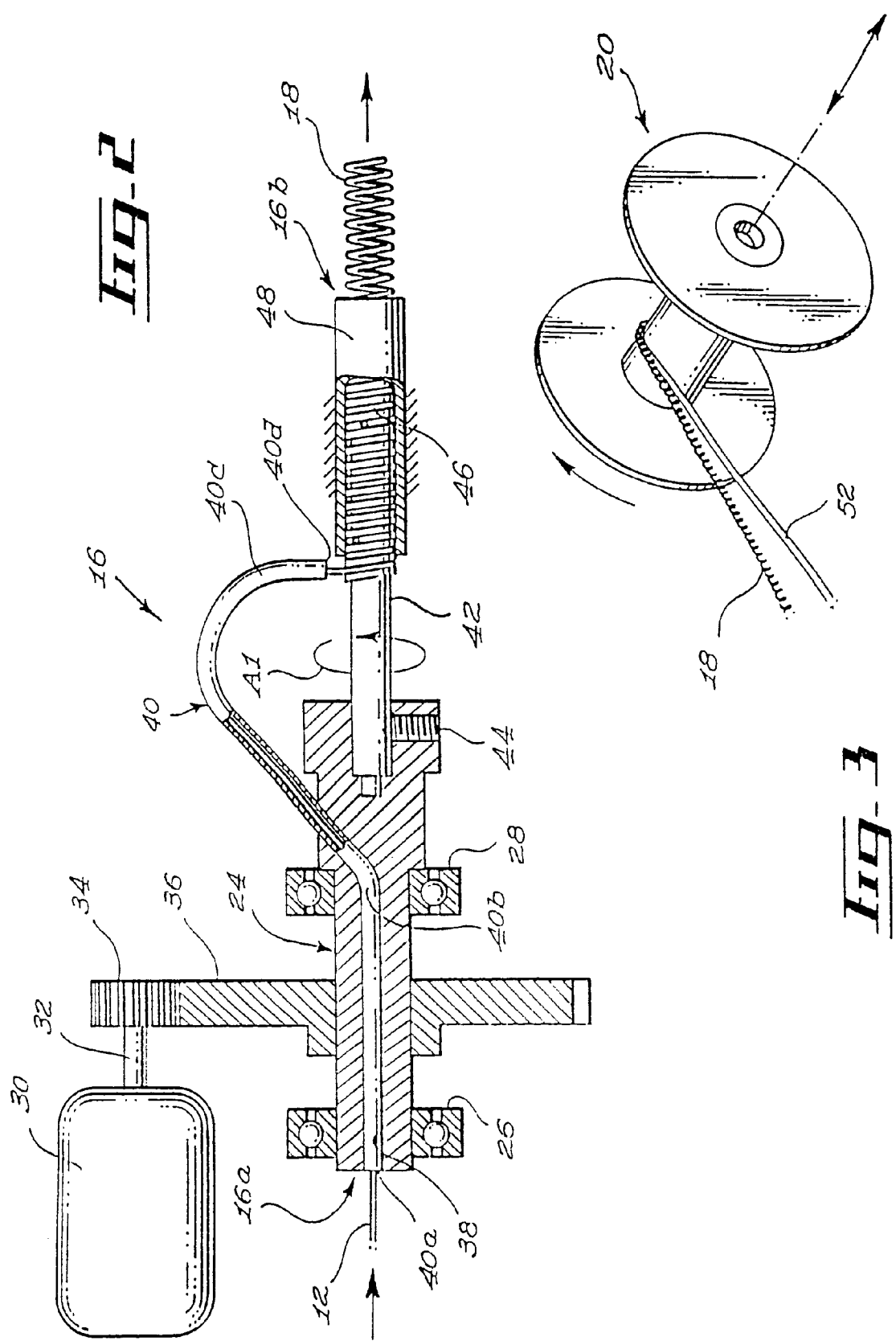

PLASTIC COIL AND METHOD OF FORMING SAME

CROSS-REFERENCE DATA

This application is a division of parent U.S. application Ser. No. 09/186,653, filed Nov. 6, 1998, Now U.S. Pat. No. 6,190,156, which claims benefit of Provisional No. 60/068,507 filed Dec. 22, 1997.

FIELD OF THE INVENTION

The present invention relates to plastic coils, and more particularly to a method for forming these plastic coils.

BACKGROUND OF THE INVENTION

Plastic coils are well known through their several uses, for example to hingedly bind the pages of a book or booklet. The coils used this way are semi-rigid plastic wires forming a cylindroid helix of constant diameter and pitch. A particular advantage of this form of plastic coil binding element is that it is not expensive to produce, while being sturdy, offering a good aesthetic appearance and allowing an efficient and easy-to-use binding element for the book pages bound in this way.

A known method of producing plastic coils comprises using a conveyor line for a thermoplastic wire in which the wire is heated so as to achieve a semi-viscous pliable state, and then fed into a helical channel in which its selected helical form is achieved by cooling the channel so that the thermoplastic wire will solidify and recover its semi-rigidity in the form of a coil shaped according to the helical channel of constant selected pitch and diameter. The cooling is achieved by any suitable means of cooling the thermally conducting channel, whereby the plastic wire will be cooled by heat transfer therethrough.

The main problem associated with this conventional method for forming plastic coils is that the coil discharged by the helical channel is imparted with a rotative movement about its longitudinal axis, in addition to the desired output discharge translational movement along this same longitudinal axis. Thus, the plastic coil wire cannot be wound around a spool for storing and carrying purposes, because of the coiled wire rotating on itself which would result in an undesirable twisting of the plastic coil on the spool. The usual way to obviate this problem is to cut the coiled wire at regular - and relatively short - lengths, for example at every three feet. This effectively prevents the coils from twisting on themselves, but prevents the coils from being stored, carried and sold as a long, unitary coil. Not only is it less interesting to sell the coils in short lenghts, but also to cut the plastic coil is likely to result in an important waste of plastic coil material. Indeed, if the length at which the coil is cut (e.g. three feet) is not a multiple of the effective used lengths of the coils (e.g. to bind books having a length of two feet), then the extra coil material (e.g. one foot long for each three feet coil) must be discarded and is wasted.

OBJECTS OF THE INVENTION

It is the gist of the present invention to provide a plastic coil and a method for forming such plastic coils with a coil forming apparatus which improves on the existing methods, and more particularly which allows the output of the coil forming apparatus to feed a continuous, non-rotating plastic coil.

SUMMARY OF THE INVENTION

The present invention relates to a method for forming a continuous plastic coil from a straight thermoplastic wire, comprising the steps of:

a) heating the thermoplastic wire until it achieves a semi-viscous malleable state;

b) injecting the heated wire with an injection nozzle into a helical channel formed by a rotating threaded mandrel axially extending into a stationary sleeve and being radially adjacent therewith, with the wire sliding along the channel in a helical travelling direction to an outlet opening;

c) cooling said channel during the injection of the wire therein, wherein said wire will effectively be formed into a plastic coil of a shape corresponding to said helical channel;

d) rotating in a common rotative movement the mandrel and the injection nozzle during the injection in a direction opposite the travelling direction and at a speed allowing the continuous plastic coil to be discharged at the outlet opening with an axial translational displacement, while being exempt of any rotational displacement about its longitudinal axis.

Preferably, the method further comprises the following step after step d):

e) winding around a spool the discharged continuous plastic coil in successive turns.

The invention also relates to a spooled continuous plastic coil obtained from the method described hereinabove, comprising a spool and an elongated continuous plastic coil defining a longitudinal axis, said plastic coil being wound at least several turns around said spool and being substantially free of any torsional forces relative to its longitudinal axis.

BRIEF DESCRIPTION OF THE DRAWINGS

In the annexed drawings:

FIG. 1 is a schematic elevation of the plastic coil forming conveyor and coil forming apparatus according to the invention;

FIG. 2 is an enlarged elevation, partly in cross-section, of the coil forming apparatus of the invention; and FIG. 3 is a perspective view of the plastic coil storing spool, with a plastic coil and its registering paper band engaging the spool.

DETAILED DESCRIPTION OF THE EMBODIMENTS

FIG. 1 schematically shows a wire supply spool 10 supplying a straight continuous flexible thermoplastic wire 12. Wire 12 is conveyed by means of a number of feeding rollers 14, e.g. four feeding rollers 14, into a plastic coil forming apparatus 16 according to the invention. Apparatus 16 forms an elongated continuous plastic coil 18 from wire 12, and preferably comprises a storing spool 20 for wounding and storing coil 16 in a manner which will be detailed hereinafter. A conventional heater device 22 is provided adjacent wire 12 and is located upstream of the rest of apparatus 16, for example between two successive pairs of feeding rollers 14, so that wire 12 may achieve a semi-viscous state which is characterized by the fact that it becomes soft and pliable while maintaining a sufficient intrinsic structural integrity to be propelled by the feeding rollers 14 throughout apparatus 16. Power means (not shown) drive rollers 14 into their rotative movement at a selected speed.

FIG. 2 shows that plastic coil forming apparatus 16 defines an upstream end 16a and a downstream end 16b, and comprises a rotatable drum 24 mounted by means of annular ball bearings 26, 28 so as to be rotatable about a fixed longitudinal axis. Drum 24 can be rotated at a selected speed by means of a motor 30 whose driving shaft 32 is axially linked to a pinion 34 tangentially and operatively engaging a complementary gear wheel 36 coaxially and integrally mounted on drum 24.

Drum 24 comprises an axial bore 38 which extends from its upstream end 16a through a significant portion of its length, i.e. about two thirds of its length, and houses a hollow swan neck pipe 40. Swan neck 40 has an upstream end 40a at the apparatus upstream end 16a, an intermediate body 40b extending axially inside drum 24, body 40b being elbowed and extending transversely through drum 24 and out to a bent downstream end 40c having an end injection nozzle 40d.

A mandrel 42 axially projects from the drum 24 downstream end and is integrally attached thereto by means of a set screw 44. Mandrel 42 comprises an axially extending threaded portion 46 on its main body, slightly spaced from drum 24 and extending to its outer free end which is hidden in FIG. 2 by a stationary sleeve 48 surrounding thread 46 in a radially adjacent fashion.

It can thus be seen that drum 24, swan neck 40 and mandrel 42, including its threaded portion 46, are all integrally linked to one another so as to be movable in a common rotative displacement.

In use, the heated thermoplastic wire 12 is fed into the swan neck upstream end 40a and travels in hollow swan neck pipe 40 out through injection nozzle 40d, which registers with the upstream extremity of mandrel thread 46 so that the semi-viscous wire 12 may conformingly engage the helical thread 46. Wire 12 is continuously propelled during use of apparatus 16 by the feeding rollers 14, and due to the sufficient structural integrity of wire 12, it remains propelled by rollers 14 from the upstream end 16a to the downstream end 16b of apparatus 16.

Wire 12 slides along the helical path of thread 46 between mandrel 42 and radially adjacent sleeve 48 out through the downstream end or outlet opening 16b. A cooling device 50 (FIG. 1) continuously cools sleeve 48 which, through heat transfer, will cool wire 12 so that it solidifies therein and takes the shape of the helical thread 46 to become coil 18 at the outlet opening 16b. Sleeve 48 is thus made of a suitable heat conductive material, such as a suitable metallic alloy.

It is understood that due to the sliding engagement of wire 12 within swan neck 40 and along thread 46 within sleeve 48, the thus engaged surfaces of swan neck 40, thread 46 and sleeve 48 must have a low friction coefficient for allowing a low-friction engagement of wire 12 therewith.

As the wire 12 is fed through apparatus 16, drum 24 is driven into a rotative movement by motor 30. Due to the integral attachment of swan neck 40 and mandrel 42 to drum 24, all three last-mentioned elements will rotate in a common rotative movement, thus remaining stationary relative to one another. With the sliding engagement of wire 12 along thread 46, it is possible to selectively adjust the direction and speed of motor 30 so that drum 24 rotates in the direction (arrow A1 of FIG. 2) opposite the rotative movement borne from the helical travelling direction of wire 12; and at a speed equal to the rotation speed of wire 12 in thread 46, so that coil 18 be discharged at outlet opening 16b with an output translational displacement, while being exempt of any rotational displacement. Consquently, coil 18 would be free of any intrinsic torsional forces and would not be prone to being twisted about its longitudinal axis while it is discharged by apparatus 16. This advantageous result is achieved in particular due to the fact that the injection nozzle 40d of swan neck 40 rotates at the same speed and in the same direction as thread 46 and thus they remain stationary relative to each other.

Therefore, any given point of wire 12 along thread 46 has an absolute translational speed equal to the output discharge speed of coil 18, while it has an absolute rotational speed which is equal to zero. This same given point of wire 12 has a translational speed relative to mandrel 42 which is equal to its absolute translational speed, while its rotational speed relative to mandrel 42 has a positive value which depends on the feeding speed confered to wire 12 by rollers 14 and on the pitch of thread 46. This last-mentioned rotational relative speed is not dependent on the rotational speed of drum 24, since drum 24 and mandrel 42 rotate in a common movement.

In a case where no or little friction occurs between wire 12 and rotative thread 46, wire 12 is not propelled by thread 46, the only purpose of the latter being to provide the suitable desired helical shape to wire 12. However, it has been found in practice that wire 12 will effectively be slightly driven into a rotative movement due to the unavoidable friction coefficient present between wire 12 and thread 46, and thus that a slight undesirable rotative movement could result at the output end 16b of device 16. To circumvent this problem, the inner surface of sleeve 48 is made to have a slightly greater friction coefficient than that of thread 46, so that wire 12 be effectively propelled by rollers 14 to slide through thread 46 inside sleeve 48, while being prevented by this slightly frictional engagement with sleeve 48 from being driven into an undesirable rotative movement by the rotation of thread 46. Thus, coil 18 would effectively have no rotational movement at the output 16b of device 16.

FIGS. 1 and 3 show that coil 18, once it is discharged by mandrel 42, is wound around storing spool 20 in consecutive turns thereon. This wounding of coil 18 is allowed by the fact that coil 18 is free of any torsional forces, and can thus be wound without it twisting on itself about its longitudinal axis. This is a particularly advantageous characteristic of the present invention over the prior art apparatuses, since the spool holding a wound continuous coil 18 can be sold in this manner, and then coil 18 can be cut at any selected regular or irregular interval of any desired length, with little or no waste of coil 18.

Preferably, a paper band 52 is wound around storing spool 20 in adjacent register with coil 18, so that paper band 52 underlie each turn of coil 18 to prevent the spires of overlapping turns of coil 18 from intermeshing with one another whereby the turns of coil 18 would be getting stuck with one another on spool 18. Band 52 is provided from paper supply spool 54, and is redirected substantially parallel to coil 18 near storing spool 20 by means of an idle roller 56.

The storing spool 20, once it holds its full capacity of turns of coil 18, thus represents a new and useful spooled continuous plastic coil product obtained from the coiling process of the present invention, which could not be obtained through the prior art apparatuses and processes. The spooled continuous plastic coil comprises a spool and an elongated continuous plastic coil defining a longitudinal axis, with the plastic coil being wound at least several turns around the spool and being substantially free of any torsional forces relative to its longitudinal axis.

Any modifications which do not deviate from the scope of the present invention, are considered to be included therein.

For example, is is considered to be within the scope of the present invention that the apparatus be adapted to coil wires of materials other than thermoplastics, e.g. soft metallic wires, wherein the heating and cooling operations would not necessarily be required if plastic deformation of the wire would be suitably achieved in the mandrel thread 46, depending on the nature of the wire material.

Also, the swan neck 40 could be replaced by any other suitable injection nozzle, as long as it rotates in a common rotative movement with the mandrel 42 and it feeds the wire into thread 46 at the upstream end thereof for forming the coil therein.

It is further envisioned that the sleeve 48 and mandrel 42 assembly could be replaced by another type of suitable helical channel, e.g. an helix-shaped pipe, as long as it also rotates in a common rotative movement with the injection nozzle. For example, such a helical channel could simply be formed by providing an integral mandrel and sleeve assembly which would rotate in a common rotative movement. The distinct mandrel 42 and sleeve 48 are the preferred embodiment, however, due to the fact that the mandrel 42 may easily be changed for one of different pitch, and the mandrel 42 and sleeve 48 may be changed for ones of different diameter. Also, the removable mandrel 42 makes it easier to accomplish maintenance and cleaning operations thereon and inside sleeve 48. Finally, and importantly, the slightly frictional engagement of sleeve 48 with wire 12 is important to prevent a slight rotational displacement of coil 18 at the device output end 16*b*. An helical channel could be used, provided that the material used therefor has a suitable non-friction relationship with the material of wire 12.

Also, the spool 20 could be replaced by any other suitable storing device. For example, the storing device could be a barrel-type storing container having a central rod axially standing on an end wall integral with a cylindrical wall. The wire could then be wound into the barrel-type container by simply dropping it on its end wall, around the rod. A cover could also be provided to close the container once it is filled with coil spires.

What is claimed is:

1. A method for forming a continuous plastic coil from a straight thermoplastic wire, comprising the steps of:
    a) heating the thermoplastic wire until it achieves a semi-viscous malleable state;
    b) injecting the heated wire with an injection nozzle into a helical channel formed by a rotating threaded mandrel axially extending into a stationary sleeve and being radially adjacent therewith, with the wire sliding along the channel in a helical travelling direction to an outlet opening;
    c) cooling said channel during the injection of the wire therein, wherein said wire will effectively be formed into a plastic coil of a shape corresponding to said helical channel;
    d) rotating in a common rotative movement the mandrel and the injection nozzle during the injection in a direction opposite the travelling direction and at a speed allowing the continuous plastic coil to be discharged at the outlet opening with an axial translational displacement, while being exempt of any rotational displacement about its longitudinal axis.

2. A method as described in claim 1, further comprising the following step after step d):
    e) winding around a spool the discharged continuous plastic coil in successive turns.

3. A method as described in claim 2, further including, during step e), the following step:
    f) winding around the spool a flat, continuous flexible paper band in radial adjacent register with the plastic coil.

* * * * *